United States Patent [19]

Jaouen

[11] 4,177,447

[45] Dec. 4, 1979

[54] DEVICE FOR DETECTING ERRORS IN A DIGITAL TRANSMISSION SYSTEM

[75] Inventor: Jean-Yves Jaouen, Lannion, France

[73] Assignee: Compagnie Industrielle des Telecommunications Cit-Alcatel, Paris, France

[21] Appl. No.: 882,315

[22] Filed: Mar. 1, 1978

[30] Foreign Application Priority Data

Mar. 4, 1977 [FR] France .................................. 77 06499

[51] Int. Cl.² ............................................. G06F 11/02
[52] U.S. Cl. .......................................... 340/146.1 AB
[58] Field of Search ................. 340/146.1 AB; 325/41

[56] References Cited

U.S. PATENT DOCUMENTS

| | | | |
|---|---|---|---|
| 3,810,111 | 5/1974 | Patel | 340/146.1 AB |
| 3,825,892 | 7/1974 | Catchpole | 340/146.1 AB |
| 3,842,401 | 10/1974 | Smith, Jr. et al. | 340/146.1 AB |
| 4,021,646 | 5/1977 | Meier | 235/92 EV |
| 4,103,148 | 7/1978 | Erickson | 235/92 EV |

Primary Examiner—David H. Malzahn
Attorney, Agent, or Firm—Roland Plottel

[57] ABSTRACT

A device for detecting errors in digital transmission systems which use a line signal whose digital running total is bounded and can only take n distinct states, e.g. a high data rate digital transmission system. The error detection device comprises a synchronous up/down counter with k bistables which give, in real time, the digital running total, and an end decoder formed by logic gates and which is sensitive to the up/down counter overflowing from either of its upper or lower limit values, the number k being an integer which satisfies the inequality:

$$2^k > n \geq 2^{k-1}.$$

15 Claims, 21 Drawing Figures

FIG.1

| B | T | |
|---|---|---|
| | M+ | M− |
| 0000 | −1 −1 −1 | +1 +1 +1 |
| 0001 | −1 −1  0 | +1 +1  0 |
| 0010 | −1  0 −1 | +1  0 +1 |
| 0011 | −1  0  0 | +1  0  0 |
| 0100 |  0 −1 −1 |  0 +1 +1 |
| 0101 |  0 −1  0 |  0 +1  0 |
| 0110 | −1 +1 −1 | +1 −1 +1 |
| 0111 | −1 +1  0 | −1 +1  0 |
| 1000 | +1 −1  0 | +1 −1  0 |
| 1001 | +1 −1 −1 | −1 +1 +1 |
| 1010 |  0 +1 −1 |  0 +1 −1 |
| 1011 | −1  0 +1 | −1  0 +1 |
| 1100 | +1  0 −1 | +1  0 −1 |
| 1101 |  0  0 −1 |  0  0 +1 |
| 1110 | −1 −1 +1 | +1 +1 −1 |
| 1111 |  0 −1 +1 |  0 −1 +1 |

FIG. 3

| T+T- | 10 | 01 | 00 |
|---|---|---|---|
| 0 | 1 | ⓪ | ⓪ |
| 1 | 2 | 0 | ① |
| 2 | 3 | 1 | ② |
| 3 | 4 | 2 | ③ |
| 4 | 5 | 3 | ④ |
| 5 | 6 | 4 | ⑤ |
| 6 | 7 | 5 | ⑥ |
| 7 | ⑦ | 6 | ⑦ |

FIG. 4

| Q1 Q2 Q3 \ T+T- | 10 | 01 | 00 |
|---|---|---|---|
| 0 0 0 | 0 0 1 | 0 0 0 | 0 0 0 |
| 0 0 1 | 0 1 0 | 0 0 0 | 0 0 1 |
| 0 1 0 | 0 1 1 | 0 0 1 | 0 1 0 |
| 0 1 1 | 1 0 0 | 0 1 0 | 0 1 1 |
| 1 0 0 | 1 0 1 | 0 1 1 | 1 0 0 |
| 1 0 1 | 1 1 0 | 1 0 0 | 1 0 1 |
| 1 1 0 | 1 1 1 | 1 0 1 | 1 1 0 |
| 1 1 1 | 1 1 1 | 1 1 0 | 1 1 1 |

FIG. 5

| | B3 | | | | | | B2 | | | | | | B1 | | | | | |
|---|---|---|---|---|---|---|---|---|---|---|---|---|---|---|---|---|---|---|
| T+T- | 10 | | 01 | | 00 | | 10 | | 01 | | 00 | | 10 | | 01 | | 00 | |
| Q3 Q2 Q1 | J3 | K3 | J3 | K3 | J3 | K3 | J2 | K2 | J2 | K2 | J2 | K2 | J1 | K1 | J1 | K1 | J1 | K1 |
| 0 0 0 | 1 | X | 1 | X | 1 | X | 1 | X | 1 | X | 1 | X | 0 | X | 1 | X | 1 | X |
| 0 0 1 | 1 | X | 1 | X | 1 | X | 0 | X | 1 | X | 1 | X | X | 0 | X | 0 | X | 1 |
| 0 1 0 | 1 | X | 1 | X | 1 | X | X | 1 | X | 0 | X | 1 | 0 | X | 0 | X | 1 | X |
| 0 1 1 | 0 | X | 1 | X | 1 | X | X | 0 | X | 1 | X | 1 | X | 0 | X | 0 | X | 1 |
| 1 0 0 | X | 1 | X | 0 | X | 1 | 1 | X | 0 | X | 1 | X | 0 | X | 0 | X | 1 | X |
| 1 0 1 | X | 1 | X | 1 | X | 1 | 0 | X | 1 | X | 1 | X | X | 0 | X | 0 | X | 1 |
| 1 1 0 | X | 1 | X | 1 | X | 1 | X | 1 | X | 0 | X | 1 | 0 | X | 0 | X | 1 | X |
| 1 1 1 | X | 1 | X | 1 | X | 1 | X | 1 | X | 1 | X | 1 | X | 1 | X | 0 | X | 1 |

FIG. 7

| T+ T− | 10 | 01 | 00 |
|---|---|---|---|
| 0 | 1 | ⓪ | ⓪ |
| 1 | 3 | 0 | ① |
| 3 | 2 | 1 | ③ |
| 2 | 6 | 3 | ② |
| 6 | 7 | 2 | ⑥ |
| 7 | 5 | 6 | ⑦ |
| 5 | 4 | 7 | ⑤ |
| 4 | ④ | 5 | ④ |

FIG. 8

| Q1 Q2 Q3 \ T+ T− | 10 | 01 | 00 |
|---|---|---|---|
| 0 0 0 | 0 0 1 | 0 0 0 | 0 0 0 |
| 0 0 1 | 0 1 1 | 0 0 0 | 0 0 1 |
| 0 1 1 | 0 1 0 | 0 0 1 | 0 1 1 |
| 0 1 0 | 1 1 0 | 0 1 1 | 0 1 0 |
| 1 1 0 | 1 1 1 | 0 1 0 | 1 1 0 |
| 1 1 1 | 1 0 1 | 1 1 0 | 1 1 1 |
| 1 0 1 | 1 0 0 | 1 1 1 | 1 0 1 |
| 1 0 0 | 1 0 0 | 1 0 1 | 1 0 0 |

FIG. 9

| Q3 Q2 Q1 \ T+ T− | D3 | | | D2 | | | D1 | | |
|---|---|---|---|---|---|---|---|---|---|
| | 10 | 01 | 00 | 10 | 01 | 00 | 10 | 01 | 00 |
| 0 0 0 | 0 | 0 | 0 | 0 | 0 | 0 | 1 | 0 | 0 |
| 0 0 1 | 0 | 0 | 0 | 1 | 0 | 0 | 1 | 0 | 1 |
| 0 1 1 | 0 | 0 | 0 | 1 | 0 | 1 | 0 | 1 | 1 |
| 0 1 0 | 1 | 0 | 0 | 1 | 1 | 1 | 0 | 1 | 0 |
| 1 1 0 | 1 | 0 | 1 | 1 | 1 | 1 | 1 | 0 | 0 |
| 1 1 1 | 1 | 1 | 1 | 0 | 1 | 1 | 1 | 0 | 1 |
| 1 0 1 | 1 | 1 | 1 | 0 | 1 | 0 | 0 | 1 | 1 |
| 1 0 0 | 1 | 1 | 1 | 0 | 0 | 0 | 0 | 1 | 0 |

| B | T | | |
|---|---|---|---|
| | M₁ | M₂ | M₃ |
| 0000 | +++ | -+- | -+- |
| 0001 | ++0 | 00- | 00- |
| 0010 | +0+ | 0-0 | 0-0 |
| 0100 | 0++ | -00 | -00 |
| 1000 | +-+ | +-+ | --- |
| 0011 | 0-+ | 0-+ | 0-+ |
| 0101 | -0+ | -0+ | -0+ |
| 1001 | 00+ | 00+ | --0 |
| 1010 | 0+0 | 0+0 | -0- |
| 1100 | +00 | +00 | 0-- |
| 0110 | -+0 | -+0 | -+0 |
| 1110 | +-0 | +-0 | +-0 |
| 1101 | +0- | +0- | +0- |
| 1011 | 0+- | 0+- | 0+- |
| 0111 | -++ | -++ | --+ |
| 1111 | ++- | +-- | +-- |

| B | T | | | |
|---|---|---|---|---|
| | M₋₁ | M₀ | M₁ | M₂ |
| 0000 | +-+ | +-+ | +-+ | --- |
| 0001 | 0+- | 0+- | 0+- | 0+- |
| 0010 | 0-+ | 0-+ | 0-- | 0-+ |
| 0011 | 0++ | 0++ | 0-- | 0-- |
| 0100 | -+0 | -+0 | -+0 | -+0 |
| 0101 | 0+0 | +-- | 0+0 | +-- |
| 0110 | -++ | 0-0 | -++ | 0-0 |
| 0111 | +-0 | +-0 | +-0 | +-0 |
| 1000 | -0+ | -0+ | -0+ | -0+ |
| 1001 | ++- | 00- | ++- | 00- |
| 1010 | 00+ | --+ | 00+ | --+ |
| 1011 | +0- | +0- | +0- | +0- |
| 1100 | +00 | -00 | +00 | -00 |
| 1101 | ++0 | ++0 | -0- | -0- |
| 1110 | +0+ | +0+ | --0 | --0 |
| 1111 | +++ | -+- | -+- | -+- |

| T+ T⁻ | 10 | 01 | 00 |
|---|---|---|---|
| 0 | 1 | ⓪ | ⓪ |
| 1 | 2 | 0 | ① |
| 2 | 3 | 1 | ② |
| 3 | 4 | 2 | ③ |
| 4 | 5 | 3 | ④ |
| 5 | ⑤ | 4 | ⑤ |

| T+ T⁻ Q1 Q2 Q3 | 10 | 01 | 00 |
|---|---|---|---|
| 0 0 0 | 0 0 1 | 0 0 0 | 0 0 0 |
| 0 0 1 | 0 1 0 | 0 0 0 | 0 0 1 |
| 0 1 0 | 0 1 1 | 0 0 1 | 0 1 0 |
| 0 1 1 | 1 0 0 | 0 1 0 | 0 1 1 |
| 1 0 0 | 1 0 1 | 0 1 1 | 1 0 0 |
| 1 0 1 | 1 0 1 | 1 0 0 | 1 0 1 |

| | B3 | | | | | | B2 | | | | | | B1 | | | | | |
|---|---|---|---|---|---|---|---|---|---|---|---|---|---|---|---|---|---|---|
| T+ T⁻ | 10 | | 01 | | 00 | | 10 | | 01 | | 00 | | 10 | | 01 | | 00 | |
| Q3 Q2 Q1 | J3 | K3 | J3 | K3 | J3 | K3 | J2 | K2 | J2 | K2 | J2 | K2 | J1 | K1 | J1 | K1 | J1 | K1 |
| 0 0 0 | 1 | X | 1 | X | 1 | X | 1 | X | 1 | X | 1 | X | 0 | X | 1 | X | 1 | X |
| 0 0 1 | 1 | X | 1 | X | 1 | X | 0 | X | 1 | X | 1 | X | X | 0 | X | 0 | X | 1 |
| 0 1 0 | 1 | X | 1 | X | 1 | X | X | 1 | X | 0 | X | 1 | 0 | X | 0 | X | 1 | X |
| 0 1 1 | 0 | X | 1 | X | 1 | X | X | 0 | X | 1 | X | 1 | X | 0 | X | 0 | X | 1 |
| 1 0 0 | X | 1 | X | 0 | X | 1 | 1 | X | 0 | X | 1 | X | 0 | X | 0 | X | 1 | X |
| 1 0 1 | X | 1 | X | 1 | X | 1 | 1 | X | 1 | X | 1 | X | X | 1 | X | 0 | X | 1 |

| T+ T⁻ | 10 | 01 | 00 |
|---|---|---|---|
| 0 | 1 | ⓪ | ⓪ |
| 1 | 3 | 0 | ① |
| 3 | 2 | 1 | ③ |
| 2 | 6 | 3 | ② |
| 6 | 7 | 2 | ⑥ |
| 7 | ⑦ | 6 | ⑦ |

| Q1 Q2 Q3 | T+ T⁻ 10 | | | 01 | | | 00 | | |
|---|---|---|---|---|---|---|---|---|---|
| 0 0 0 | 0 | 0 | 1 | 0 | 0 | 0 | 0 | 0 | 0 |
| 0 0 1 | 0 | 1 | 1 | 0 | 0 | 0 | 0 | 0 | 1 |
| 0 1 1 | 0 | 1 | 0 | 0 | 0 | 1 | 0 | 1 | 1 |
| 0 1 0 | 1 | 1 | 0 | 0 | 1 | 1 | 0 | 1 | 0 |
| 1 1 0 | 1 | 1 | 1 | 0 | 1 | 0 | 1 | 1 | 0 |
| 1 1 1 | 1 | 1 | 1 | 1 | 1 | 0 | 1 | 1 | 1 |

| | T+ T⁻ | D3 | | | D2 | | | D1 | | |
|---|---|---|---|---|---|---|---|---|---|---|
| Q3 Q2 Q1 | | 10 | 01 | 00 | 10 | 01 | 00 | 10 | 01 | 00 |
| 0 0 0 | | 0 | 0 | 0 | 0 | 0 | 0 | 1 | 0 | 0 |
| 0 0 1 | | 0 | 0 | 0 | 1 | 0 | 0 | 1 | 0 | 1 |
| 0 1 1 | | 0 | 0 | 0 | 1 | 0 | 1 | 0 | 1 | 1 |
| 0 1 0 | | 1 | 0 | 0 | 1 | 1 | 1 | 0 | 1 | 0 |
| 1 1 0 | | 1 | 0 | 1 | 1 | 1 | 1 | 1 | 0 | 0 |
| 1 1 1 | | 1 | 1 | 1 | 1 | 1 | 1 | 1 | 0 | 1 |

DEVICE FOR DETECTING ERRORS IN A DIGITAL TRANSMISSION SYSTEM

The present invention relates to error detection in digital transmission systems which use a line signal of bounded digital running total. It relates more particularly to error detection by means of the digital running total overflowing.

The signal emitted in a line in digital transmission systems is a signal which can only take discrete values. It is characterized in particular by its digital running total. To obtain this total, the discrete values which the line signal can assume have relative numbers assigned to them, these relative numbers are proportional to the corresponding amplitudes, and the total is defined as the sum of the numbers designating the successive signal elements which have been emitted since an origin in time.

The signal emitted in the line must include no DC component and as few low-frequency components as possible. There are at least two reasons for this: the first is that the line repeaters are in general remote-powered by direct current which must be easy to separate from the signal in the line even though it flows in the same medium, and the second reason is that the amplifiers used up till now do not transmit low-frequency components. These restrictions force the signal in the line to have a bounded digital running total. To satisfy this condition, it is necessary for the line code used to include some redundancy which is very useful in other respects. Indeed, it has been shown that, due to this redundancy, the probability is close to 1 that an error added to the line signal will modify the running total sum; this justifies a method of error detection by means of the digital running total overflowing.

The digital running total of the line signal is measured by calculating at each instant in real time, the algebraic sum of the relative numbers which correspond to the successive signal elements. It requires logic devices which are capable of operating at the rate of the digital transmission system in question.

Two sorts of logic devices for performing this operation on ternary line signals are known. A ternary line is a signal whose elements can have a zero amplitude or a non-zero amplitude of one polarity or the other, with 0, +1 and −1 as the associated relative numbers.

The first logic device comprises a right-left shift register and an associated decoding assembly constituted by logic gates. The shift register has n−1 bistables (n being the number of states which the digital running total can take) and the complete device has a number of logic gates which is greater than 3(n−1) due to the three functions of the register: shift right, shift left and hold the present state.

One way of making this device operate consists in loading the shift register from the right with a logic level 1 when at ternary digit appears which has +1 as its relative number, in loading it from the left with a logic level 0 when a ternary digit appears which has −1 as its relative number and in holding it in its present state when a ternary digit appears which has 0 as its relative number. The associated decoding assembly is designed to detect the appearance of a logic level 0 at the last register on the right and of a logic level 1 at the last register on the left which correspond to overflows of the digital running total.

The second logic device is an adder-subtractor formed by half-adders connected in cascade and comprises a high number of logic gates.

The maximum operation frequency of these circuit, even when they are constructed from E.C.L. (Emitter coupled logic) technology, is limited by the large number of logic stages which a signal must pass through when it is being processed. This makes these circuits unsuitable for very high rate digital transmission systems.

The present invention aims to produce line error detecting devices which are sensitive to overflows of the digital running total, and which use as low a number of logic stages as possible in order to obtain a very high maximum operating frequency.

It provides a logic device for detecting errors in a line of digital transmission system which uses a line signal having a bounded digital running total which can take n distinct states. This device comprises a synchronous up/down counter with K bistables associated with an end decoder formed by logic gates where the number K is an integer which satisfies in inequality:

$$2^{K-1} < n \leq 2^K$$

Other characteristics and advantages of the invention will become apparent from the accompanying claims and from the description hereinbelow of several embodiments given by way of an example. This description will be given with reference to the accompanying drawings in which:

FIG. 1 is the table of definitions of a 4B/3T code with two alphabets;

FIG. 3 is the matrix of the phase and the up/down counter used in the circuit shown in FIG. 2;

FIG. 4 is the matrix of the transitions of the above-mentioned up/down counter;

FIG. 5 is the truth table of the above-mentioned up/down counter;

FIG. 7 is the matrix of the phases of the up/down counter used in the circuit shown in FIG. 6;

FIG. 8 is the matrix of the transitions of the above-mentioned up/down counter;

FIG. 9 is the truth table of the above-mentioned up/down counter;

FIG. 10 is the table of definitions of a 4B/3T code with three alphabets, known as MS43;

FIG. 11 is the table of definitions of a 4B/3T code with four alphabets, known as FOMOT;

Examples of transmission systems which have a line signal with a bounded digital running total are given from those systems which use, 4B/3T codes to generate the line signal.

4B/3T codes are codes which make a word of three ternary elements, (excluding the ternary word formed by a sequence of three zeros), correspond to a sequence of four binary elements. Among these 4B/3T codes, those which are more particularly known are the simple two-alphabet code which gives a line signal which has a bounded digital running total which is limited to eight distinct states, the three-alphabet 4B/3T code known as MS43 and the four-alphabet 4B/3T code known as FOMOT which both give a line signal which has a bounded digital running total which is limited to six distinct states.

The first detection circuits which are described apply to digital transmission systems which use in a line signal whose digital running total is bounded and is limited to eight states and the last two apply to digital transmission systems using in a line signal whose digital running total is bounded and is limited to six states.

FIG. 1 is the table of definitions of a simple 4B/3T code with two alphabets M+ and M−. The two alphabets M+ and M− are inverses of each other except for the words whose sum is zero. One of them; M+, is used when the running total is positive or zero, while the other, M−, is used when this running total is negative, so as to give the running total a constant tendency towards zero. It can be shown that with such a code, the running total can occupy eight distinct states (−4 to +3 inclusive) and that the probability of an error causing an overflow, of the running total by positive or negative value, is close to 1 while it is only 1/21 that an error will cause the appearance of the excluded ternary word formed by three consecutive zeros.

Figure 2:
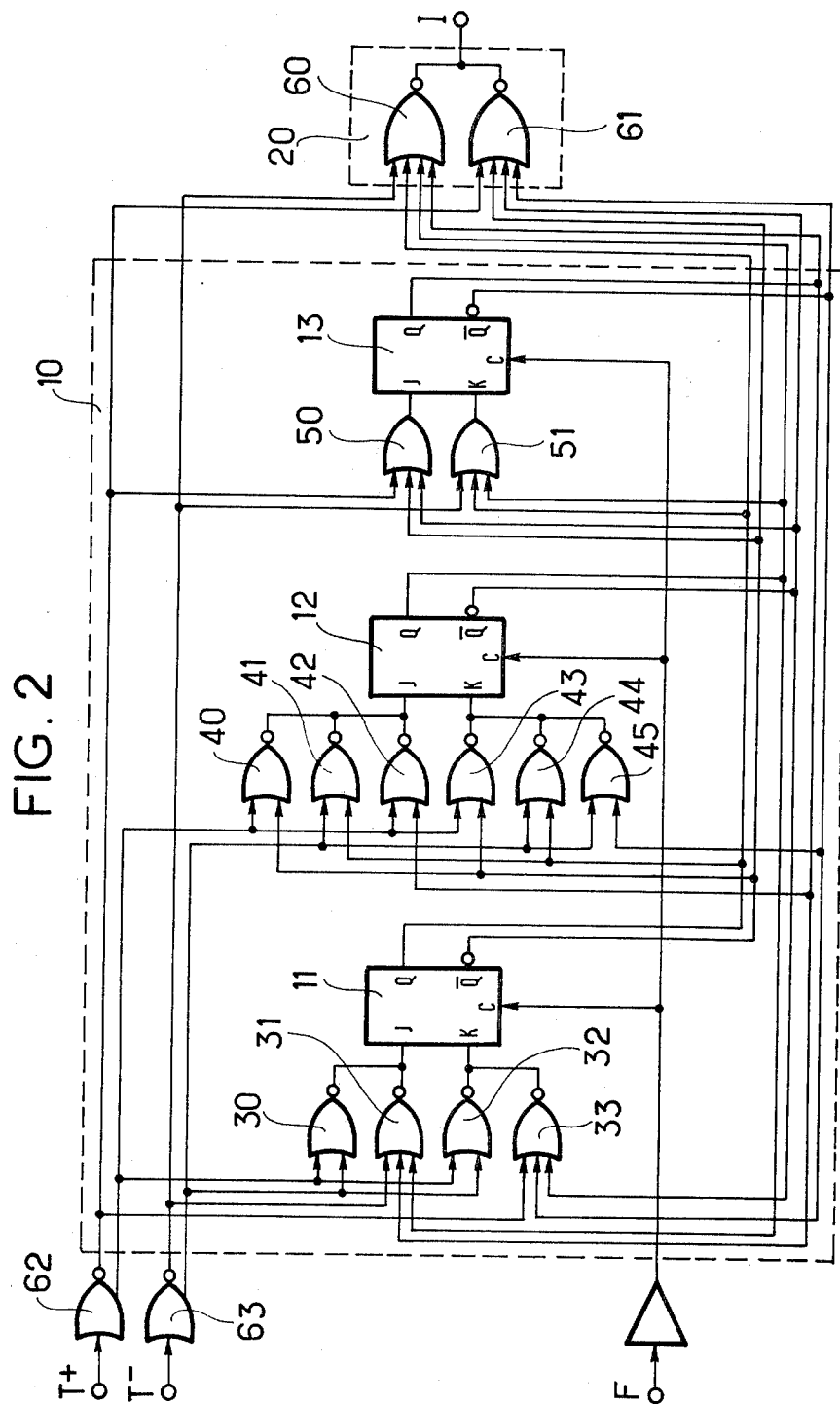
FIG. 2 is the circuit diagram of an error detection circuit in accordance with the invention and adapted to a ternary signal which has a bounded digital running total limited to eight possible states.

FIG. 2 is the circuit diagram of an error detection circuit in accordance with the invention which can be used with a digital transmission system using the preceding code. This circuit comprises a synchronous modulo 8 up/down counter referenced by the numeral 10 and an end decoder reference by the numeral 20. The synchronous up/down counter 10 has an up count input T+, a down count input T− distinct from each other and a clock input F. It is formed by three JK type bistables 11, 12 and 13 connected together and to the up count and down count inputs T+ and T− by means of logic gates so connected as to satisfy the following logic equations: For the first bistable 11:

$$J_1 = \overline{T^+} \cdot \overline{T^-} + T \cdot \overline{Q_2} \cdot \overline{Q_3} \tag{1}$$

$$K_1 = \overline{T^+} \cdot \overline{T^-} + T^+ \cdot Q_2 \cdot Q_3 \tag{2}$$

For the second bistable 12:

$$J_2 = \overline{T^+} \cdot Q_1 + \overline{T^-} \cdot \overline{Q_1} + \overline{T^+} \cdot \overline{Q_3} \tag{3}$$

$$K_2 = \overline{T^+} \cdot Q_1 + \overline{T^{+1}} \cdot \overline{Q_1} + \overline{T^-} \cdot Q_3 \tag{4}$$

For the third bistable 13:
$$J_3 = \overline{T^+} + \overline{Q_1} + \overline{Q_2} \tag{5}$$
$$K_3 = \overline{T^-} + Q_1 + Q_2 \tag{6}$$

The magnitudes J, K and Q designate respectively logic levels of the J input, the K input and the Q output of a JK type bistable and the indices 1, 2 and 3 indicate that the magnitudes relate to the first bistable 11, the second bistable 12 or the third bistable 13.

To obtain the first logic equation (1), the J input of the bistable 11 is connected to the outputs of two "NOR" logic gates 30 and 31, one of which 30, has two inputs while the other, 31, has three inputs. The "NOR" logic gate 30 receives on one of its inputs the variable T+ and on the other input the variable T− and performs the logic function $\overline{T^+} \cdot \overline{T^-}$. The "NOR" type logic gate 31 performs the logic function $\overline{T^-} \cdot \overline{Q_2} \cdot \overline{Q_3}$. It receives on one input the variable $\overline{T^-}$, on another the variable $Q_2$ available at the Q output of the second bistable 12 and on its third input the variable $Q_2$ available at the Q output of the third bistable 13.

To obtain the second logic equation (2), the K input of the bistable 11 is connected to the outputs of two "NOR" type logic gates 32 and 33, one of which 32, has two inputs while the other 33, has three inputs. The "NOR" logic gate 32 performs the logic function $\overline{T^+} \cdot \overline{T^-}$ and has both its inputs connected in parallel to those of the logic gate 30. The "NOR" logic gate 33 performs the logic function $\overline{T^+} \cdot Q_2 \cdot Q_3$. It receives on one input the variable $\overline{T^+}$, on another input the variable $\overline{Q_2}$ available on the $\overline{Q}$ output of the bistable 12 and on a third input the variable $\overline{Q_3}$ available on the $\overline{Q}$ output of the bistable 13.

To obtain the third logic equation (3), the J input of the bistable 12 is connected to the outputs of three "NOR" type logic gates 40, 41 and 42 which have two inputs each. The logic "NOR" type gate 40 performs the logic function $\overline{T^+} \cdot Q_1$. It receives on one input the variable T+ and on the other input the variable $\overline{Q_1}$ available on the $\overline{Q}$ output of the bistable 11. The "NOR" type logic gate performs the logic function $\overline{T^-} \cdot \overline{Q_1}$. It receives on one input the variable T− and on the other input the variable $Q_1$ available on the Q output of the bistable 11. The "NOR" type logic gate 42 performs the logic function $\overline{T^+} \cdot \overline{Q_3}$. It receives on one input the variable T+ and on the other input the variable $Q_3$ available on the Q output of the pistable 13.

To obtain the fourth logic equation (4), the K input of the bistable 12 is connected to the outputs of three "NOR" type logic gates 43, 44 and 45 which have two inputs each. The "NOR" type logic gate 43 performs the logic function $\overline{T^+} \cdot Q_1$ and has both its inputs connected in parallel to those of the logic gate 40. The "NOR" type logic gate 44 performs the logic function $\overline{T^-} \cdot \overline{Q_1}$ and has both its inputs connected in parallel to those of the logic gate 41. The "NOR" logic gate 45 performs the logic function $\overline{T^-} \cdot Q_3$. It receives on one input the variable T− and on the other input the variable $\overline{Q_3}$ available on the $\overline{Q}$ output of the bistable 13.

To obtain the fifth logic equation (5), the J input of the bistable 13 is connected to the output of an "OR" logic gate 50 which has three inputs. This gate receives on a first input the variable $\overline{T^+}$, on a second input, the variable $\overline{Q_1}$ which is available on the $\overline{Q}$ output of the bistable 11 and on the third input the variable $Q_2$ which is available on the $Q$ output of the bistable 12.

To obtain the sixth logic equation (6), the K input of the bistable 13 is connected to the output of an "OR" type logic gate 51 which has three inputs. This gate receives on one input the variable $\overline{T^-}$, on a second input the variable $Q_1$ available on the $Q$ output of the bistable 11 and on a third input the variable $Q_2$ which is available on the $Q$ output of the bistable 12.

The end decoder 20 performs the logic function:

$$T^+ \cdot (Q_1 \cdot Q_2 \cdot Q_3) + T^- \cdot (\overline{Q_1} \cdot \overline{Q_2} \cdot \overline{Q_3}) \qquad (7)$$

It comprises two "NOR" logic gates which have four inputs with their outputs connected in parallel. The "NOR" logic gate 61 performs the logic function $\overline{T^+ \cdot Q_1 \cdot Q_2 \cdot Q_3}$. It receives on a first input the variable $\overline{T^+}$, on a second input the variable $\overline{Q_1}$ which is available on the $\overline{Q}$ output of the bistable 11, on a third input the variable $\overline{Q_2}$ which is available on the $\overline{Q}$ output of the bistable 12 and on a fourth input the variable $\overline{Q_3}$ which is available ont the $\overline{Q}$ output of the bistable 13. The "NOR" logic gate 60 performs the logic function $\overline{T^- \cdot \overline{Q_1} \cdot \overline{Q_2} \cdot \overline{Q_3}}$. It receives on a first input the variable $\overline{T^-}$, on a second input the variable $Q_1$ which is available at the $Q$ output of the bistable 11, on a third input the variable $Q_2$ which is available on the $Q$ output of the bistable 12 and on a fourth input the variable $Q_3$ which is available on the $Q$ output of the bistable 13.

The variables $T^+$ and $T^-$ as well as their complements are distributed to the various logic gates by means of two driver logic gates 62 and 63 which have a non-inverted and an inverted output.

The logic equations (1) to (7) which govern the operation of the circuit shown in FIG. 1 can be obtained as follows:

An attempt is made to produce a synchronous modulo 8 up/down counter from three JK type bistables. The eight states which it must be able to take are defined by the three-digit binary numbers, the $Q$ output of each bistable supplying one digit. The complexity of the logic circuit which ensures the interactions between the monostables 11, 12 and 13 depends on the binary coding of each of these states. The binary coding adopted has been chosen to simplify the circuit as much as possible. After a natural binary-decimal transcoding, it corresponds to the counting sequence in the natural order : 0, 1, 2, 3, 4, 5, 6 and 7.

FIG. 3 shows the matrix of its phases as a function of the up count $T^+$ and the down count $T^-$ instructions, the phases being referenced by the encircled numbers are stable.

In this figure and in the following figures, it is assumed that a counting instruction results in a logic level 1 for the variable $T^+$, that a down count instruction results in a logic level 1 for the variable $T^-$ and that it is not possible for there to be an up count instructions and a down count instructions simultaneously.

FIG. 4 is the matrix of the transitions which groups together the set of logic states which the Q outputs of the bistables 11, 12 and 13 must take to obtain an up count cycle whose form is: 0, 1, 2, 3, 4, 5, 6 and 7, a down count cycle whose form is: 7, 6, 5, 4, 3, 2, 1 and 0 and the blocking of the up/down counter when it is in the state 7 and it receives an up count instruction ($T^+ = 1$) or when it is in the state 0 and it receives a down count instruction ($T^- = 1$). The magnitudes $Q_1$, $Q_2$ and $Q_3$ designate respectively the logic levels of the Q outputs of the respective bistables 11, 12 and 13. The numerals in bold-faced characters correspond to changes in logic levels in relation to the preceding state.

The signals which it is necessary to apply to their J and K inputs to satisfy the matrix of the transitions shown in FIG. 4 are then deduced from the well-known operation of JK bistables. These signals are grouped together in a truth table shown in FIG. 5. In this figure, "don't care 0 or 1" signals have been represented by crosses.

The logic functions (1), (2), (3), (4), (5) and (6) are determined from the truth table of FIG. 5 by means of Karnaugh diagrams which have five variables, the don't care signals being used for simplification, as in the configuration $T^+ \cdot T^- = 11$.

The logic function satisfied by the end decoder 20 proceeds from the fact that it must transmit every down count pulse when the outputs of the three bistables 11, 12 and 13 are at logic level 0 and every up count pulse when these latter outputs are at logic level 1.

The operation of the error detection circuit shown in FIG. 2 is as follows:

The ternary signal available in the line is divided, by means of diode switching, into a series of pulses, some positive and others negative. The negative pulses have their polarity inverted and are then applied to the $T^-$ input of the circuit.

The ternary signal is also used for reconstituting the rate or rapidity of modulation which acts as a clock signal for the three bistables of the counter. The rate is reconstituted in a conventional way. It will not be explained, since it does not form a part of the present invention.

On starting up, the up/down counter is in any initial state. It takes a correct state as soon as the digital running total reaches its upper and lower limits, which occurs very rapidly with the simple two-alphabet 4B/3T code. After the starting up period necessary for the up/down counter to reach a correct state, any overflow is the consequence of an error in the signal in the line.

The circuit shown in FIG. 2 comprises three JK bistables and fourteen "OR" and "NOR" logic gates. Its maximum operation frequency is determined by the internal synchronization loops of which there exists only one type which is composed of a logic gate placed between two bistables. The time required for the correct operation of these internal synchronization loops is at the most equal to the sum: of the propagation time in a bistable, of the propagation time in a gate and of the pre-positioning time of a bistable. With an E.C.L. type technology, a period of less than 1.5 ns and consequently a maximum operation frequency of about 670 MHz can be hoped for; this frequency is inaccessible with circuits of the prior art previously mentioned.

Figure 6:
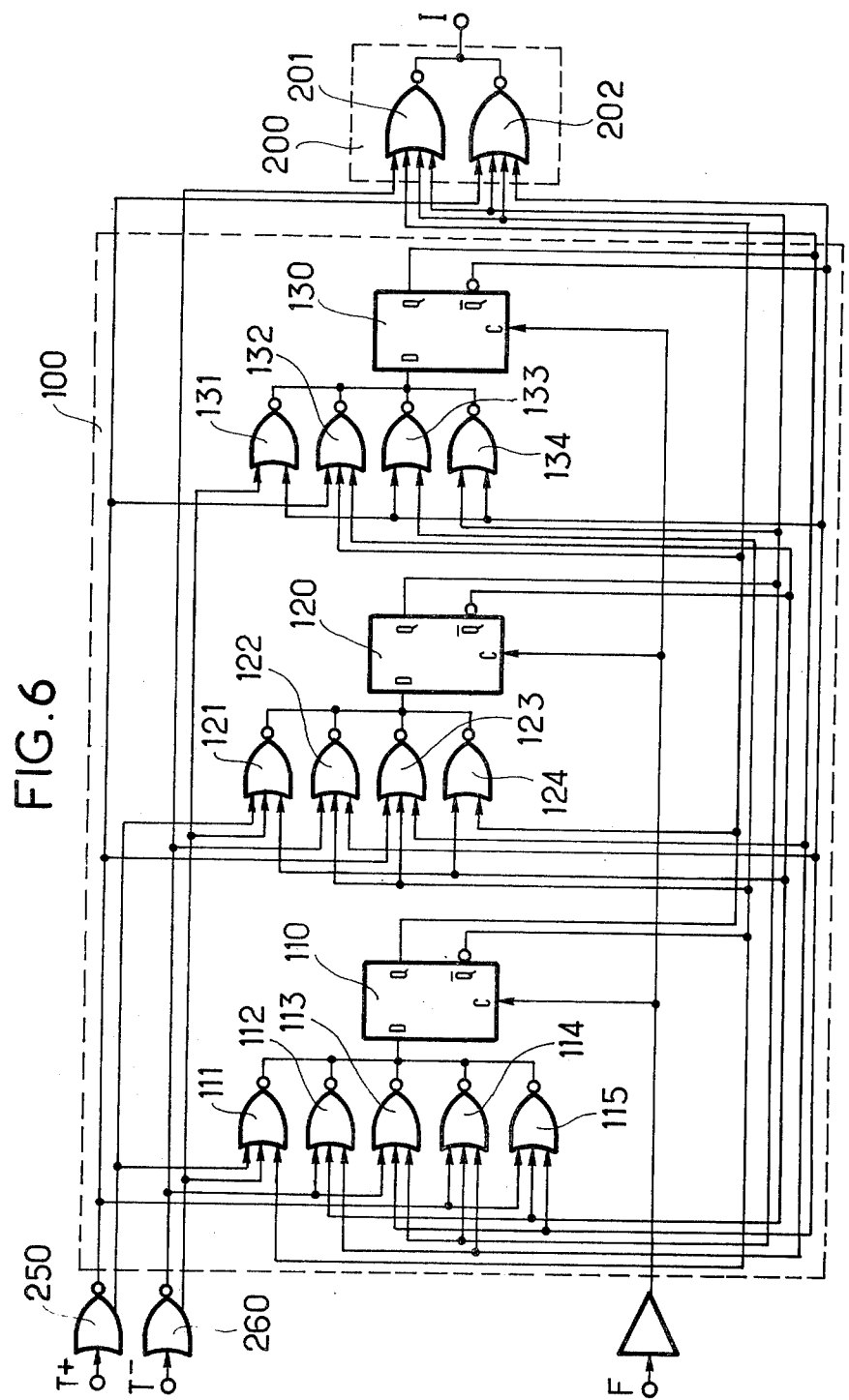
FIG. 6 is the circuit diagram of a second error detection circuit in accordance with the invention and which is adapted to a ternary signal which has a bounded digital running total which is limited to eight possible states.

FIG. 6 is the circuit diagram of another error detection circuit which can be used in a digital transmission system which has a line signal whose bounded digital running total can take eight distinct states. This circuit differs from the previous one by its use of D type bistables. It comprises a synchronous modulo 8 up/down counter referenced by the numeral 100 and an end decoder referenced by the numeral 200. It has an up count input which receives the up count pulses $T^+$, a down count input which receives the down count pulses $T^-$ and a clock input. The up/down counter 100 is formed by three D type bistables 110, 120 and 130 which are interconnected and connected to the up count and down count inputs by means of "NOR" logic gates so as to satisfy the following logic equations:
For the first D type bistable 110:

$$D_1 = \overline{T^+ + T^- + \overline{Q}_1} + \overline{T^- + \overline{Q}_2 + Q_3} + \overline{T^- + Q_2 + \overline{Q}_3} + \overline{T^+ + Q_2 + Q_3} + \overline{T^+ + \overline{Q}_2 + \overline{Q}_3} \quad (8)$$

For the second D type bistable 120:

$$D_2 = \overline{T^+ + T^- + \overline{Q}_2} + \overline{T^- + \overline{Q}_1 + \overline{Q}_3} + \overline{T^+ + \overline{Q}_1 + Q_3} + \overline{Q_1 + \overline{Q}_2} \quad (9)$$

For the third D type bistable 130:

$$D_3 = \overline{T^- + \overline{Q}_3} + \overline{T^+ + Q_1 + \overline{Q}_2} + \overline{\overline{Q}_1 + \overline{Q}_3} + \overline{Q_2 + \overline{Q}_3} \quad (10)$$

The magnitudes D and Q designate respectively the logic levels on the D input and the Q output of a bistable and their indices 1, 2 and 3 specify the bistable 110, 120 or 130 to which they refer.

To obtain the logic equation (8), the D input of the bistable 110 is connected to the outputs of five "NOR" logic gates 111, 112, 113, 114 and 115 which have three inputs. The first logic gate 111 performs the logic function:

$$\overline{T^+ + T^- + \overline{Q}_1}$$

It receives on one input the variable T+, on another input the variable T− and on the last input the variable $\overline{Q}_1$ which is available on the $\overline{Q}$ output of the first bistable 110. The second logic gate 112 performs the logic function:

$$\overline{T^- + \overline{Q}_2 + Q_3}$$

It receives on one input the variable T−, on another input the variable $\overline{Q}_2$ which is available on the $\overline{Q}$ output of the second bistable 120 and on the last input the variable $Q_3$ which is available on the Q output of the third bistable 130. The third logic gate 113 performs the logic function:

$$\overline{T^- + Q_2 + \overline{Q}_3}$$

It receives on one input the variable T−, on another input the variable $Q_2$ which is available on the Q output of the second bistable 120 and on the last input the variable $\overline{Q}_3$ which is available on the $\overline{Q}$ of the third bistable 130. The fourth logic gate 114 performs the logic function:

$$\overline{T^+ + Q_2 + Q_3}$$

It receives on one input the variable T+, on another input the variable $Q_2$ which is available on the Q output of the second bistable 120 and on the last input the variable $Q_3$ which is available on the Q output of the third bistable 130.

The fifth logic gate 115 performs the logic function:

$$\overline{T^+ + \overline{Q}_2 + \overline{Q}_3}$$

It receives on one input the variable T+, on another input, the variable $\overline{Q}_2$ which is available on the $\overline{Q}$ output of the second bistable 120 and on the last output the variable $\overline{Q}_3$ which is available on the $\overline{Q}$ output of the third bistable 130.

To obtain the logic equation (9), the D input of the bistable 120 is connected to the outputs of four "NOR" logic gates 121, 122, 123 and 124. The first logic gate 121 has three inputs. It performs the function:

$$\overline{T^+ + T^- + \overline{Q}_2}$$

It receives on one input the variable T+, on another input the variable T− and on the last input the variable $\overline{Q}_2$ which is available on the $\overline{Q}$ output of the first bistable 120. The second logic gate 122 has three inputs. It performs the function:

$$\overline{T^- + \overline{Q}_1 + \overline{Q}_3}$$

It receives on one input the variable T−, on another input the variable $\overline{Q}_1$ which is available on the $\overline{Q}$ output of the first bistable 110 and on the third input the variable $\overline{Q}_3$ which is available on the $\overline{Q}$ output of the third bistable 130. The third logic gate 123 has three inputs. It performs the function:

$$\overline{T^+ + \overline{Q}_1 + Q_3}$$

It receives on one input the variable T+, on another input the variable $\overline{Q}_1$ which is available on the $\overline{Q}$ output of the first bistable 110 and on the third input the variable $Q_3$ which is available on the Q output of the third bistable 130.

The fourth lobic gate 121 has two inputs. It performs the logic function:

$$\overline{Q_1 + \overline{Q}_2}$$

It receives on one input the variable $Q_1$, which is available on the Q output of the first bistable 110 and on the other input it receives the variable $\overline{Q}_2$ which is available on the $\overline{Q}$ output of the second bistable 120.

To obtain the logic equation (10), the D input of the third bistable 130 is connected to the outputs of four "NOR" logic gates 131, 132, 133 and 134. The first logic gate 131 has two inputs. It performs the logic function:

$$\overline{T^- + \overline{Q}_3}$$

It receives on one input the variable T−, and on the other input the variable $\overline{Q}_3$ which is available on the $\overline{Q}$ of the third bistable 130. The second logic gate 132 has three inputs. It performs the logic function:

$$\overline{T^+ + Q_1 + \overline{Q}_2}$$

It receives on one input the variable T+, on another input the variable $Q_1$ which is available on the Q output of the first bistable 110 and on the last input the variable $\overline{Q}_2$ which is available on the $\overline{Q}$ output of the second bistable 120. The third logic gate 133 has two inputs. It performs the logic function:

$$\overline{\overline{Q}_1 + \overline{Q}_3}$$

. It receives on one input the variable $\overline{Q}_1$ which is available on the $\overline{Q}$ output of the first bistable 110 and on another input the variable $\overline{Q}_3$ which is available on the $\overline{Q}$ output of the third bistable 130. The fourth logic gate 134 has two inputs. It performs the logic function:

$$\overline{Q_2 + \overline{Q}_3}$$

It receives on one input the variable $Q_2$ which is available on the Q output of the second bistable 120 and on the other input the variable $\overline{Q_3}$ which is available on the output $\overline{Q}$ of the third bistable 130.

The end decoder 200 performs the logic function:

$$T^+ \cdot (\overline{Q_1} \cdot \overline{Q_2} \cdot Q_3) + T^- \cdot (\overline{Q_1} \cdot \overline{Q_2} \cdot \overline{Q_3})$$

It comprises two "NOR" logic gates 201 and 202 with four inputs each which have their outputs connected in parallel. The logic gate 201 performs the logic function $T^- \cdot \overline{Q_1} \cdot \overline{Q_2} \cdot \overline{Q_3}$. It receives on a first input the logic variable $T^-$, on a second input the variable $Q_1$ which is available on the Q output of the first bistable 110, on a third input the variable $Q_2$ which is available on the Q output of the second bistable 120 and on a fourth input the variable $Q_3$ which is available on the Q output of the third bistable 130. The logic gate 202 performs the logic function $T^+ \cdot \overline{Q_1} \cdot Q_2 \cdot Q_3$. It receives on a first input the variable $T^+$, on a second input the variable $Q_1$ which is available on the Q output of the first bistable 110, on a third input the variable $Q_2$ which is available on the Q output of the second bistable 120 and on a fourth input the variable $\overline{Q_3}$ which is available on the $\overline{Q}$ output of the third bistable 130.

As in the case of the circuit shown in FIG. 2, the variables $T^+$ and $T^-$ are distributed to the various logic gates by means of two driver logic gates 250 and 260 which have a non-inverted output and an inverted output.

The logic equations which govern the operation of the circuit shown in FIG. 6 are obtained in a manner entirely analogous to that described and used previously for the circuit shown in FIG. 2.

An attempt is made to produce synchronous modulo 8 up/down counter by means of three D type bistables. The eight states which it must be able to take are defined by the three-digit binary numbers, the Q output of each bistable supplying a digit. The binary coding adopted for these states with a view to simplifying the logic circuit which produces the interactions between the bistables corresponds, by natural binary to decimal transcoding, to the counting sequence: 0, 1, 3, 2, 6, 7, 5 and 4.

FIG. 7 is the matrix of its phases as a function of the up count instructions $T^+$ and the down count instruction $T^-$, the phases which referenced by the encircled numbers are stable.

FIG. 8 shows the matrix of the transitions grouping together the set of logic states which the Q outputs of the bistables 110, 120 and 130 must take to obtain the required operation, i.e. the up count cycle 0, 1, 3, 2, 6, 7, 5 and 4, the down count cycle 4, 5, 7, 6, 2, 3, 1 and 0 for blocking the up/down counter when it is in the state 4 and it receives an up count pulse or in the state 0 and it receives a down count pulse. In this figure, $Q_1$, $Q_2$ and $Q_3$ designate the logic variables available at the Q output of the D type bistables 110, 120 and 130. The indices 1, 2 and 3 indicate respectively the bistables 110, 120 and 130 to which the variable relates. The numerals in bold-faced characters correspond to changes of logic levels in relation to the previous state.

The signals which it is necessary to apply to their D inputs to satisfy the matrix of the transitions in FIG. 8 are then deduced from the well-known operation of D type bistables. These signals are grouped together in a truth table in FIG. 9. The logic functions (8), (9) and (10), are determined from this truth table by means of Karnaugh diagrams which have five variables, the configuration $T^+ \cdot T^- = 11$ being used for simplification.

The logic function satisfied by the end decoder 200 proceeds from the fact that it must transmit every down count pulse when the up/down counter is in the state 0 and any every up count when the up/down counter is in the state 4.

The circuit described in relation to FIG. 6 comprises three D bistables and fifteen "NOR" logic gates. Like the preceding circuit, it has only one type of internal synchronisation loop in which there is only one logic gate placed between two bistables. Hence it has the same maximum operation frequency.

The two previously described error detection circuits are adapted only to digital transmission systems which have a line signal whose digital running total can take eight distinct states. They are not suitable for other digital transmission systems, in particular those which use, to generate the line signal, a 4B/3T code with three alphabets which is called M S 4 3 or with four alphabets which is called F O M O T and for which the number of distinct states which the digital running total can take differs from eight. FIG. 10 is the table of definitions of the M S 4 3 code. This code comprises three alphabets $M_1$, $M_2$, $M_3$ and has a digital running total limited to four terminal states (states which it can take between each word) which can be annotated $-1$, 0, $+1$ and 2. The alphabet $M_1$ is used when the digital running total has a value of 0 or $+1$ and the alphabet $M_3$ is used when the digital running total has a value of $+2$. FIG. 11 is the table of definitions of the F O M O T code. This code comprises four alphabets, $M_{-1}$, $M_0$, $M_1$, $M_2$ and has, like the preceding code, a digital running total limited to four terminal states which can be annotated: $-1$, 0, $+1$ and 2. The alphabet $M_{-1}$ is used when the digital running total has a value of $-1$, the alphabet $M_0$ is used when the digital running total has a value of 0, the alphabet $M_1$ is used when the digital running total has a value of 1 and the alphabet $M_2$ is used when the digital running total has a value of 2.

Figure 12:
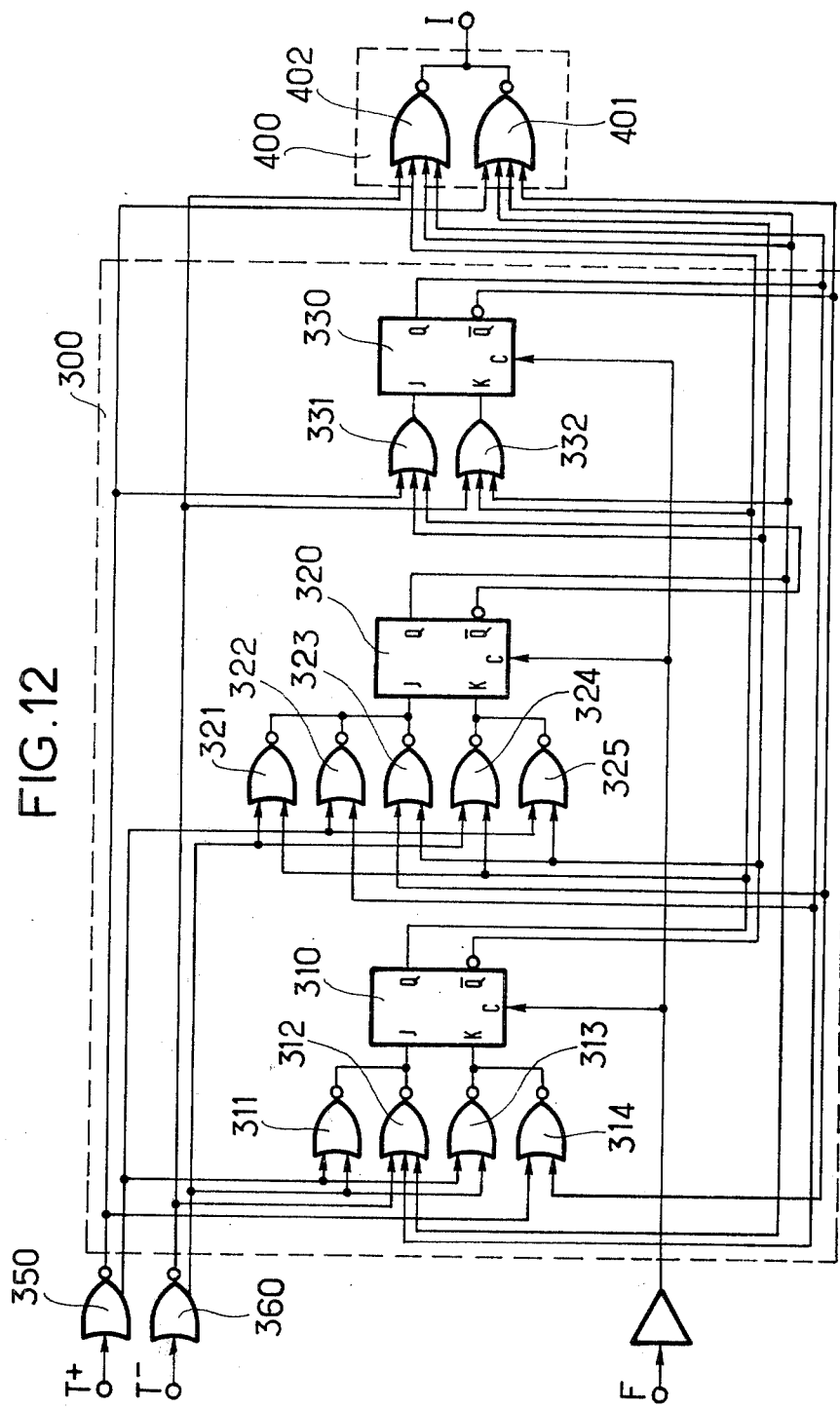
FIG. 12 is the circuit diagram of an error detection circuit in accordance with the invention and which is adapted to a ternary signal which has a bounded digital running total limited to six possible states.
Figure 17:
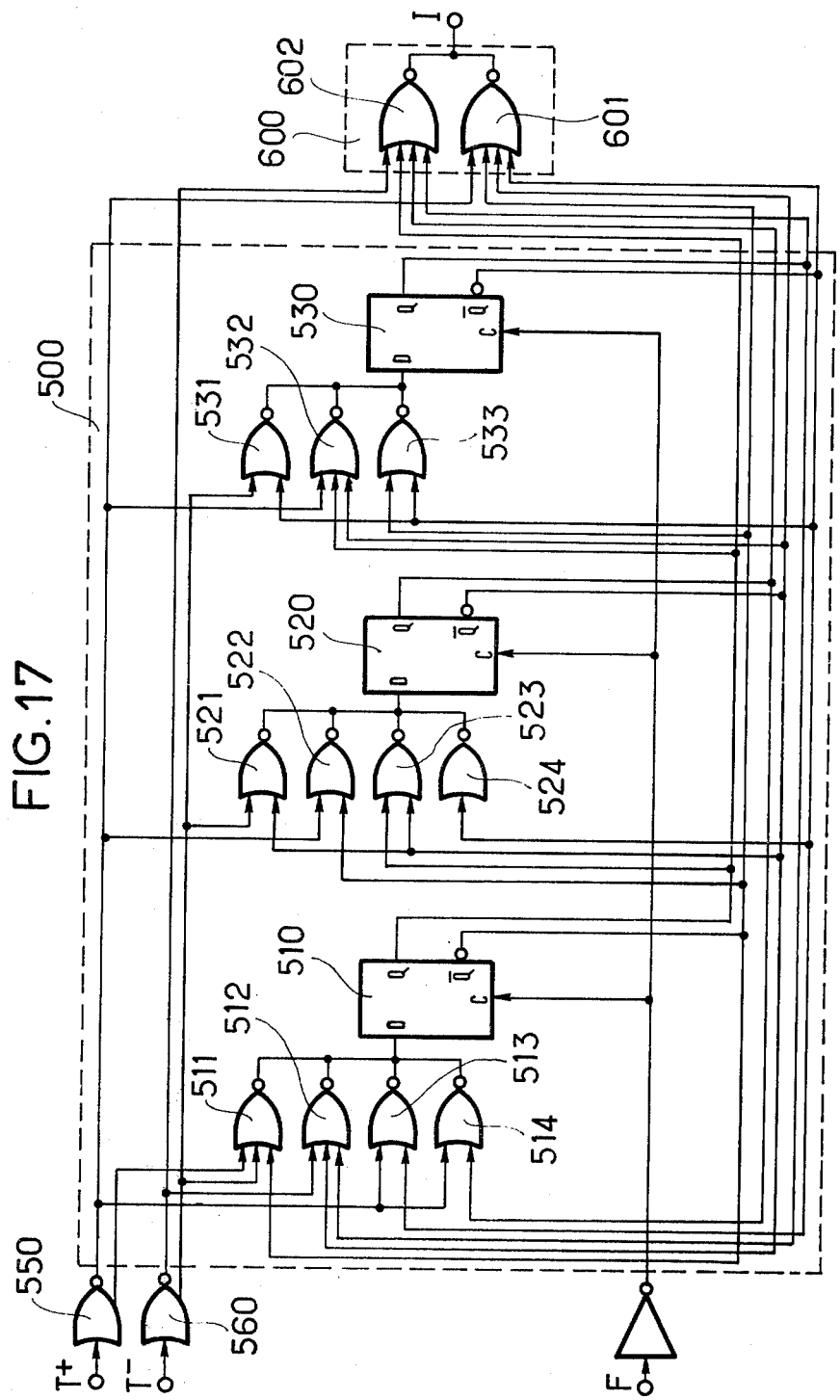
FIG. 17 is the circuit diagram of a second error detection circuit in accordance with the invention and which is adapted to a ternary signal which has a bounded digital running total which is limited to six possible states.

The 4B/3T codes called M S 4 3 and F O M O T have a digital running total which can occupy six states: two intermediate states during ternary words and four terminal states. FIGS. 12 and 17 are the circuit diagrams of two error detection circuits in accordance with the invention, which are adapted to these codes.

FIG. 12 shows an error detection circuit which comprises a synchronous modulo 6 up/down counter referenced by the numeral 300 and an end decoder referenced by the numeral 400. The up/down counter 300 comrises an up count input on which it receives the up count pulses $T^+$, a down count input on which it receives the down count pulses $T^-$ and a clock input F. It is formed by three JK bistables 310, 320 and 330 connected to each other and to the up count and the down count inputs by means of "NOR" and "OR" logic gates so as to satisfy the following logic equations:

For the first JK bistable 310:

$$J_1 = \overline{T^+ + T^-} + \overline{T^- + Q_2 + Q_3} \tag{11}$$

$$K_1 = \overline{T^+ + T^-} + \overline{T^+ + \overline{Q_3}} \tag{12}$$

For the second JK bistable 320:

$$J_2 = \overline{T^- + Q_1} + \overline{T^+ + Q_3} + \overline{\overline{Q_1} + \overline{Q_3}} \tag{13}$$

$$K_2 = \overline{T^- + Q_1} + \overline{T^r + \overline{Q_1}} \tag{14}$$

For the third JK bistable 330:

$$J_3 = T^+ + \overline{Q}_1 + \overline{Q}_2 \quad (15)$$

$$K_3 = T^- + Q_1 + Q_2 \quad (16)$$

The magnitudes J, K and Q designate respectively the logic levels on the J input, the K input and the Q output of a JK bistable and their indices indicate the bistable to which they relate, the coefficient 1 being relative to the bistable 310, the coefficient 2 being relative to the bistable 320 and the coefficient 3 being relative to the bistable 330.

To obtain the logic equation (11), the J input of the bistable 310 is connected to the outputs of two "NOR" logic gates 311 and 312. The logic gate 311 has two inputs. It performs the function:

$$\overline{T^+ + T^-}$$

It receives on one input the variable $T^+$ and on the other the variable $T^-$. The logic gate 312 has three inputs. It performs the function:

$$\overline{T^- + Q_2 + Q_3}$$

It receives on a first input the variable $T^-$, on a second input the variable $Q_2$ which is available on the Q output of the second bistable 320 and on the third input the variable $Q_3$ which is available on the Q output of the third bistable 330.

To obtain the logic equation (12), the K input of the bistable 310 is connected to the outputs of two "NOR" logic gates 313 and 314. Which have two inputs. The logic gate 313 performs the function:

$$\overline{T^+ + T^-}$$

It has its inputs connected in parallel with those of the "NOR" logic gate 311. The logic gate 314 performs the function:

$$\overline{T^+ + \overline{Q}_3}$$

It receives on one input the variable $T^+$ and on the other the variable $\overline{Q}_3$ which is available at the $\overline{Q}$ output of the bistable 330.

To obtain the logic equation (13), the J input of the bistable 320 is connected to the outputs of three "NOR" logic gates 321, 322 and 323. Which have two inputs each. The "NOR" logic gate 321 performs the function:

$$\overline{T^- + Q_1}$$

It receives on one input the variable $T^-$ and on the other the variable $Q_1$ which is available at the Q output of the bistable 310. The "NOR" logic gate 322 performs the function:

$$\overline{T^+ + \overline{Q}_3}$$

It receives on one input the variable $T^+$ and on the other the variable $\overline{Q}_3$ which is available at the $\overline{Q}$ output of the bistable 330. The "NOR" logic gate 323 performs the function:

$$\overline{\overline{Q}_1 + \overline{Q}_3}$$

It receives on one input the variable $\overline{Q}_1$ which is available on the $\overline{Q}$ output of the bistable 310 and on the other the variable $\overline{Q}_3$ which is available on the $\overline{Q}$ output of the bistable 330.

To obtain the logic equation (14), the K input of the bistable 320 is connected to the outputs of two "NOR" logic gates 324 and 325, which have two inputs each. The "NOR" logic gate 324 performs the function:

$$\overline{T^- + Q_1}$$

It receives on one input the variable $T^-$ and on the other the variable $Q_1$ which is available on the Q output of the bistable 310. The "NOR" logic gate 325 performs the function:

$$\overline{T^+ + \overline{Q}_1}$$

It receives on one input the variable $T^+$ and on the other the variable $\overline{Q}_1$ which is available on the $\overline{Q}$ output of the bistable 310.

To obtain the logic equation (15), the J input of the bistable 330 is connected to the output of an "OR" logic gate 331 which has three inputs, the first receiving the variable $T^+$, the second receiving the variable $\overline{Q}$ which is available on the $\overline{Q}$ output of the bistable 310 and the third receiving the variable $\overline{Q}_2$ which is available on the $\overline{Q}$ output of the bistable 320.

To obtain the logic equation (16), the K input of the bistable 330 is connected to the output of an "OR" logic gate 332 which has three inputs, the first receiving the variable $T^-$, the second receiving the variable $Q_1$ which is available on the Q output of the bistable $Q_2$ which is available on the Q output of the bistable 320.

The end decoder 400 satisfies the logic equation:

$$y = T^+ \cdot Q_1 \cdot \overline{Q}_2 \cdot Q_3 + T^- \cdot \overline{Q}_1 \cdot \overline{Q}_2 \cdot \overline{Q}_3$$

It comprises two "NOR" logic gates 401 and 402 which have four inputs each. The "NOR" logic gate 401 performs the logic function $T^+ \cdot Q_1 \cdot Q_2 \cdot Q_3$. It receives on its first input the variable $T^+$, on its second input the variable $\overline{Q}_1$ which is available on the $\overline{Q}$ output of the bistable 310, on its third input the variable $Q_2$ which is available on the Q output of the second bistable 320 and on its fourth input the variable $\overline{Q}_3$ which is available on the $\overline{Q}$ output of the third bistable 330. The "NOR" logic gate 402 performs the logic function $T^- \cdot \overline{Q}_1 \cdot \overline{Q}_2 \cdot \overline{Q}_3$. It receives on its first input the variable $T^-$, on its second input the variable $Q_1$ which is available on the Q output of the bistable 310, on its third input the variable $Q_2$ which is available on the Q output of the bistable 320 and on its fourth input the variable $Q_3$ which is available at the Q output of the bistable 330.

As previously the variables $T^+$ and $T^-$, as well as their complements $\overline{T^+}$ and $\overline{T^-}$ are distributed to the various logic gates by means of two driver logic gates 350 and 360 each having two outputs, one of them inverted and the other not inverted.

The logic equations which determine the structure of the circuit which has just been described with reference to FIG. 12 can be obtained in the same way as for the preceding circuits.

The up/down counter required is a synchronous modulo 6 up/down counter formed by means of three JK bistables. The six states which it must be able to take are defined by three-digit binary numbers, the Q output of each bistable supplying one digit. The binary coding adopted for these states corresponds after natural binary to decimal transcoding to the up count sequence: 0, 1, 2, 3, 4 and 5.

Figures 13, 14, 15, 16:
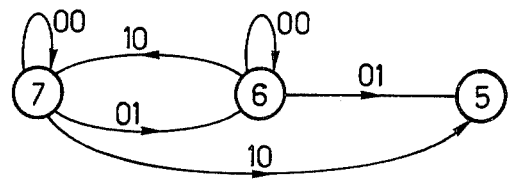
FIG. 13 is the matrix of the phases of the up/down counter used in the circuit shown in FIG. 12.
FIG. 14 is the matrix of the transitions of the preceding up/down counter.
FIG. 15 is the truth table of the preceding up/down counter.
FIG. 16 is a diagram of the unused states of the preceding up/down counter.

FIG. 13 is the matrix of its up count and down count phases as a function of the variables T+ and T−, the phases which are referenced by encircled numbers are stable.

FIG. 14 is the matrix of transitions grouping together the set of logic states which the Q outputs of the three bistables 310, 320 and 330 must take to obtain an up count cycle which has the form: 0, 1, 2, 3, 4 and 5, a down count cycle: 5, 4, 3, 2, 1 and 0 and the blocking of the up/down counter when it is in the state 5 and receives an up count pulse or when it is in the state 0 and receives a down count pulse. In this figure, $Q_1$, $Q_2$ and $Q_3$ designate the logic variables available at the Q outputs of the bistables. The indices 1, 2 and 3 indicate the bistable 310, 320 and 330 respectively to which reference is made. The values in bold-faced characters correspond to changes of logic level in relation to the preceding state.

The signals which it is necessary to apply to their J and K inputs to satisfy the matrix of the transitions in FIG. 14 are deduced from the well-known operation of JK bistables. These signals are grouped together in a truth table in FIG. 15. In this figure, the "don't care 0 or 1" signals have been represented by crosses.

The logic functions (11), (12), (13), (14), (15) and (16) are determined from the previous truth table by means of Karnaugh diagrams which have five variables, the configuration $T^+ \cdot T^- = 11$ being used for simplification.

The logic function satisfied by the decoder 400 is deduced from the fact that it must transmit every up count pulse when the up/down counter is in the state 5 and every down count pulse when the up/down counter is in the state 0.

The circuit which has just been described with reference to FIG. 12 comprises three JK flip-flops and thirteen "NOR" or "OR" logic gates. Like the preceding circuits, it has only one type of internal synchronization loop in which there is only one logic gate placed between two bistables. Hence, when it is produced with the same technology, it has a maximum operation frequency which is approximately the same as that of the preceding circuits.

Its operation is identical to that of the preceding circuits. The positive values of the ternary signal received in the line are used as T+ up count pulses. The negative values of this same ternary signal are, after inversion of polarity, used as a T− down count pulses. A rate signal constituted from the ternary signal received in the line is used as a clock signal for the three bistables 310, 320 and 330.

Contrary to the previous circuits, the up/down counter 300 in FIG. 12 has two unused states: the state 6 and the state 7. But if it is originally in one of these states, it returns automatically to the state 5 after a more or less long period. Indeed, examination of the equations (11) to (16) which govern the signals applied to the J and K inputs of the bistables 310, 320 and 330, it is seen that the up/down counter satisfies the state diagram in FIG. 16, the two-figure numbers 00, 10 and 01 corresponding to the logic values which the pair of variables $T^+ \cdot T^-$ can take, i.e. to a an up count instruction for the number 10 a down count instruction for the number 01 and a hold instruction the number 00. As the probabilities for having an up count instruction, a down count instruction or a hold instruction are substantially equal and close to $\frac{1}{3}$, the transient state will be short. Once the up/down counter is out of the unused states, it takes a correct state as soon as the digital running total has reached its upper limit or its lower limit, this occurring very rapidly since there is only a small number of states possible.

FIG. 17 shows another error detection circuit which can be used with a ternary signal which has a bounded digital running total which can take only six distinct states. This error detection circuit comprises a synchronous modulo 6 up/down counter referenced by the numeral 500 and an end decoder referenced by the numeral 600.

The synchronous modulo 6 up/down counter 500 comprises an up count input on which it receives the T+ pulses, a down count input on which it receives the T− pulses and a clock input F. It is formed by three D type bistables 510, 520 and 530 interconnected and connected to the up and the down count inputs by means of "NOR" logic gates so as to satisfy the following logic equations:

For the first bistable 510

$$D_1 = \overline{T^+ + T^- + \overline{Q}_1} + \overline{T^- + \overline{Q}_2 + Q_3} + \overline{T^+ + \overline{Q}_3} + \overline{T^+ + Q_2} \quad (17)$$

For the second bistable 520

$$D_2 = \overline{T^- + \overline{Q}_2} + \overline{T^+ + \overline{Q}_1} + \overline{Q_1 + \overline{Q}_2} + Q_3 \quad (18)$$

For the third bistable 530

$$D_3 = \overline{T^- + \overline{Q}_3} + \overline{T^+ + Q_1 + \overline{Q}_2} + \overline{Q_1 + Q_3} \quad (19)$$

The magnitudes D and Q designate respectively the D input and the Q output of a D bistable, their indices indicating the bistable to which they are related, the index 1, 2 or 3 being relative to the bistable 510, 520 or 530 respectively.

To satisfy the logic equation (17) the D input of the bistable 510 is connected to the outputs of four "NOR" logic gates 511, 512, 513 and 514. The logic gate 511 has three inputs. It performs the function:

$$\overline{T^+ + T^- + \overline{Q}_1}$$

It receives on a first input the variable T+, on a second input the variable T and on its third input the variable $\overline{Q}$ which is available on the $\overline{Q}$ output of the bistable 510. The logic gate 512 has three inputs. It performs the function:

$$\overline{T^- + Q_2 + Q_3}$$

It receives on a first input the variable $\overline{T^-}$, on a second input the variable $\overline{Q}_2$ which is available on the output of the bistable 520 and on a third input the variable $Q_3$ which is available on the Q output of the bistable 530. The "NOR" logic gate 513 has two inputs. It performs the function:

$$\overline{T^+ + \overline{Q}_3}$$

It receives on one input the variable $\overline{T}^+$ and on the other input the variable $Q_3$ which is available on the $\overline{Q}$ output of the bistable 530. The "NOR" logic gate 514 has two inputs. It performs the function:

$$\overline{T^+ + Q_2}$$

It receives on one input the variable $\overline{T}+$, and on the other input the variable $\overline{Q_2}$ which is available on the Q output of the bistable 520.

To satisfy the logic equation (18) the D input of the bistable 520 is connected to the outputs of four "NOR" logic gates 521, 522, and 523 which have two inputs and, by means of an inverter 524 at the $\overline{Q}$ output of the bistable 530. The logic gate 521 performs the function:

$$\overline{T^- + \overline{Q_2}}$$

It receives on one input the variable $T^-$ and on the other input the variable $\overline{Q_2}$ which is available on the $\overline{Q}$ output of the bistable 520. The logic gate 522 performs the function:

$$\overline{T^+ + \overline{Q_1}}$$

It receives on a first input the variable $\overline{T}+$, and on the other input the variable $\overline{Q_1}$ which is available on the $\overline{Q}$ output of the bistable 510. The logic gate 523 performs the function:

$$\overline{Q_1 + \overline{Q_2}}$$

It receives on one input the variable $Q_1$, which is available on the $\overline{Q}$ output of the bistable 520.

To satisfy the logic equation (19) the D input of the bistable 530 is connected to the outputs of three "NOR" logic gates 531, 532 and 533. The logic gate 531 has two inputs and performs the function:

$$\overline{T^- + \overline{Q_3}}$$

It receives on one input the variable $T^-$, and on the other input the variable $\overline{Q_3}$ which is available on the $\overline{Q}$ output of the bistable 530. The "NOR" logic gate 532 has three inputs. It performs the function:

$$\overline{T^+ + Q_1 + \overline{Q_2}}$$

It receives on one input the variable $\overline{T}+$, on another input the variable $Q_1$ which is available on the Q output of the bistable 510 and on its last input the variable $\overline{Q_2}$ which is available on the Q output of the bistable 520. The "NOR" logic gate 533 has two inputs. It performs the function:

$$\overline{\overline{Q_1} + \overline{Q_3}}$$

It receives on one input the variable $Q_1$, which is available on the $\overline{Q}$ output of the bistable 510 and on the other input the variable $\overline{Q_3}$ which is available on the $\overline{Q}$ output of the bistable 530.

The end decoder 600 satisfies the logic equation.

$$y = T^+ \cdot Q_1 \cdot Q_2 \cdot Q_3 + T^- \cdot \overline{Q_1} \cdot \overline{Q_2} \cdot \overline{Q_3}$$

It comprises two "NOR" logic gates 601 and 602 with four inputs each and which have their outputs connected in parallel. The logic gate 601 performs the function: $T^+ \cdot Q_1 \cdot Q_2 \cdot Q_3$. It receives on a first input the variable $\overline{T}+$, on a second input the variable $\overline{Q_1}$ which is available on the $\overline{Q}$ output of the bistable 510, on a third input the variable $\overline{Q_2}$ which is available on the $\overline{Q}$ output of the bistable 520 and on a fourth input the variable $\overline{Q_3}$ which is available on the $\overline{Q}$ output of the bistable 530. The logic gate 602 performs the function: $T^- \cdot \overline{Q_1} \cdot \overline{Q_2} \cdot \overline{Q_3}$. It receives on a first input the variable $\overline{T}-$, on a second input the variable $Q_1$ which is available on the Q output of the bistable 510, on a third input the variable $Q_2$ which is available on the Q output of the bistable 520 and on a fourth input the variable $Q_3$ which is available on the Q output of the bistable 530.

The variable $T^+$ and $T^-$, as well as their complents $\overline{T}+$ and $\overline{T}-$, are distributed to the various logic gates by means of two driver logic gates 550 and 560 each of which has two outputs, one of them inverted and the other not inverted.

To obtain the logic equations which determine the struture of the up/down counter, it is possible to proceed in the same way as for the previous circuit.

An attempt is made to produce a modulo 6 synchronous up/down counter from three D bistables. The six states which it must be able to take are defined by the three-digit binary numbers, the Q output of each bistable supplying one digit. The up count sequence chosen to simplify the circuit as much as possible is, after natural binary to decimal transcoding: 0, 1, 3, 2, 6 and 7.

Figures 18, 19, 20, 21:
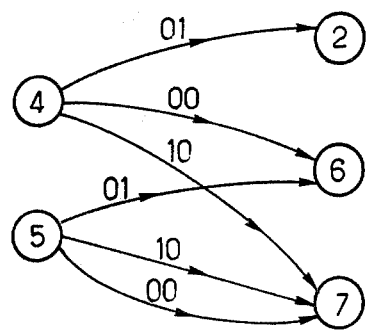
FIG. 18 is the matrix of the phases of the up/down counter used in the circuit shown in FIG. 17.
FIG. 19 is the matrix of the transitions of the preceding up/down counter.
FIG. 20 is the truth table of the preceding up/down counter.
FIG. 21 is a diagram of the unused states of the preceding up/down counter.

FIG. 18 shows the matrix of the forward and reverse count phases as a function of the variables $T^+$ and $T^-$, the phases which are referenced by an encircled figure are stable.

FIG. 19 is the matrix of the transitions which group together the set of logic states which the Q outputs of the three bistables 510, 520 and 530 must take to obtain an up count cycle of the form: 0, 1, 3, 2, 6 and 7, a down count cycle of the form: 7, 6, 2, 3, 1 and 0 and a blocking of the up/down counter when it is in the state 7 and it receives an up count pulse $T^+$ or when it is in the state 0 and it receives a down count pulse $T^-$. The indices 1, 2 or 3 indicate that reference is made to the bistable 510, 510 or 530. The figures in bold-faced characters correspond to changes in logic levels in relation to the previous state.

The signals which it is necessary to apply to their D inputs to satisfy the matrix of the transitions in FIG. 19 are deduced from the well-known operation of D type bistables. These signals are grouped together in a truth table in FIG. 20.

The logic functions (17), (18), and (19), are determined from the previous truth table by means of Karnaugh diagrams which have five variables, the configuration $T^+ \cdot T^- = 11$ being used used for simplification.

The logic function satisfied by the end decoder 600 is deduced from the fact that it must transmit the up count pulses when the up/down counter is at 7 and the down count pulses when the up/down counter is at 0.

The circuit which has just been described with reference to FIG. 17 comprises three D type bistables and thirteen "NOR" logic gates. Like the proceding circuits, it has only one type of internal synchronization loop in which there is only one logic gate placed between two bistables. Due to this fact, when it is formed with the same technology, it has the same maximum operation frequency—a frequency which, with E. D. L. technology, can reach 670 MHz.

Its operation as an error detector is analogous to that of the previously described circuits. The positive values of the ternary signal in the line are used as up count pulses $T^+$; after inversion of polarity, the negative values are used as down count pulses $T^-$ and the rate signal reconstituted from the ternary signal in the line is used as a clock signal for the up/down counter 500.

The up/down counter 500 which is a part of the last circuit described (FIG. 17) has two unused states: the state 4 and the state 5. But if it is in one of these states, it returns automatically to one of the states 2, 6, or 7 of the normal cycle at the following instant. This is apparent from the state diagram shown in FIG. 21 which proceeds from the studying of the values of the excitations (17), (18) and (19) applied to the D inputs of the bistables 510, 520 and 530 when the up/down counter is in the initial state 4 or 5 and there appears either an up count instruction, the variables T+ and T− taking the value 10, or a down count instruction, the variables T+ and T− taking the value 01, or a hold instruction, the variables T+ and T− taking the value 00. It will be observed from FIG. 21 that the up/down counter 500 is necessarily in its normal cycle after the first clock pulse. It takes the correct state as soon as the ruuning digital total has reached its upper limit and its lover limit.

Without going beyond the scope of the invention, some dispositions can be modified or some means can be replaced by equivalent means.

I claim:

1. Apparatus for detecting errors in a digital transmission system of a type wherein the signal transmitted has a bounded digital running total which can assume any one of n distinct states, characterized by:
   a synchronous up/down counter having an up-count input and a down-count input both of which are connected to receive said transmitted signal, said counter including K bi-stable multivibrators each of which has at least one input and first and second, complementary, outputs, each multivibrator having a logic arrangement associated with the at least one input thereto, said logic arrangement having a plurality of inputs connected to said up-count input, to said down-count input, and to selected ones of the first and second outputs of the remaining (K-1) multi-vibrators in the up/down counter; and
   an end-decoder sensitive to any overflow of a lowest or highest count in said up/down counter, said decoder including first and second logic circuits having inputs respectively connected to (a) said up-count input and the first outputs of said K bi-stable multivibrators, and (b) said down-count input and the second outputs of said K bi-stable multivibrators, and wherein:
   K, the number of bistable multi-vibrators in said up/down counter, is an integer which satisfies the inequality:

$$2^{K-1} < n \leq 2^K.$$

2. The apparatus according to claim 1 wherein each of the bi-stable multivibrators in said up/down counter comprises a J-K type flip-flop having a J input, a K input and first and second, complementary, Q, $\overline{Q}$ outputs.

3. The apparatus according to claim 2 wherein said transmitted signal is a ternary signal with n=8, i.e., said signal can assume any of 8 distinct states, said apparatus being further characterized in that:
   said up-count input, hereinafter designated T+, receives the positive and zero values of said ternary signal;
   said down-count input, hereinafter designated T−, receives the negative and zero values of said ternary signal, these negative and zero signals having previously undergone a polarity inversion; and
   K=3, i.e., said up/down counter comprises 3 J-K type flip-flops, the logic arrangements associated with each of said flip-flops being interconnected such that their inputs and outputs satisfy the following logic equations:

for the first flip-flop:

$$J_1 = \overline{T^+} \cdot \overline{T^-} + T^- \cdot \overline{Q_2} \cdot \overline{Q_3}$$

$$K_1 = \overline{T^+} \cdot \overline{T^-} + T^+ \cdot Q_2 \cdot Q_3$$

for the second flip-flop:

$$J_2 = \overline{T^+} \cdot Q_1 + \overline{T^-} \cdot \overline{Q_1} + \overline{T^+} \cdot \overline{Q_3}$$

$$K_2 = \overline{T^+} \cdot Q_1 + \overline{T^-} \cdot \overline{Q_1} + \overline{T^-} \cdot Q_3$$

for the third flip-flop:

$$J_3 = \overline{T^+} + \overline{Q_1} + \overline{Q_2}$$

$$K_3 = \overline{T^-} + Q_1 + Q_2$$

said end decoder performing the logic function:

$$T^+ \cdot Q_1 \cdot Q_2 \cdot Q_3 + T^- \cdot \overline{Q_1} \cdot \overline{Q_2} \cdot \overline{Q_3},$$

the magnitudes J, K and Q designating respectively the logic levels of the J input, the K input and the Q output of said J-K type flip-flops and the subscripts 1, 2 or 3 indicating that the magnitude refers to the first, second or third flip-flop, respectively.

4. The apparatus according to claim 3 wherein each of said logic arrangements comprises a plurality of OR-gates and the first and second logic circuits in said end-decoder each comprises an OR-gate.

5. The apparatus according to claim 4 wherein each of said OR-gates is a negative logic OR-gate, i.e., a NOR-gate.

6. The apparatus according to claim 2 wherein said transmitted signal is a ternary signal with n=6, i.e., said signal can assume any of 6 distinct states, said apparatus being further characterized in that:
   said up-count input, hereinafter designated T+, receives the positive and zero values of said ternary signal;
   said down-count input, hereinafter designated T−, receives the negative and zero values of said ternary signal, these negative and zero signals having previously undergone a polarity inversion;
   K=3, i.e., said up/down counter comprises three J-K type arrangements associated with each of said flip-flops being interconnected such that their inputs and outputs satisfy the following logic equations:

for the first flip-flop:

$$J_1 = \overline{T^+ + T^-} + \overline{T^-} + Q_2 + Q_3$$

$$K_1 = \overline{T^+ + T^-} + \overline{T^+ + Q_3}$$

for the second flip-flop:

$$J_2 = \overline{T^- + Q_1} + \overline{T^+ + Q_3} + \overline{\overline{Q_1} + \overline{Q_3}}$$

$$K_2 = \overline{T^- + Q_1} + \overline{T^+ + \overline{Q_1}}$$

for the third flip-flop:

$$J_3 = \overline{T^+} + \overline{Q_1} + \overline{Q_2}$$

$$K_3 = \overline{T^-} + Q_1 + Q_2$$

said end decoder performing the logic function:

$$T^+ \cdot Q_1 \cdot Q_2 \cdot Q_3 + T^- \cdot Q_1 \cdot Q_2 \cdot Q_3,$$

the magnitudes J, K and Q designating respectively the logic levels of the J input, the K input and the Q output of said J-K type flip-flops and the subscripts 1, 2 or 3 indicating that the magnitude refers to the first, second or third flip-flop, respectively.

7. The apparatus according to claim 6 wherein each of said logic arrangements comprises a plurality of OR-gates and said first and second logic circuits in said end-decoder each comprises an OR-gate.

8. The apparatus according to claim 7 wherein each of said OR-gates comprises a negative logic OR-gate, i.e., a NOR-gate.

9. The apparatus according to claim 1 wherein each of the bi-stable multivibrators in said up/down counter comprises a D-type flip-flop having the a D input and first and second, complementary, Q, $\overline{Q}$ outputs.

10. The apparatus according to claim 9 wherein said transmitted signal is a ternary signal with n=8, i.e., said signal can assume any of 8 distinct states, said apparatus being further characterized in that:

said up-count input, hereinafter designated T+, receives the positive and zero values of said ternary signal;

said down-count input, hereinafter designated T−, receives the negative or zero values of said ternary signal, these negative and zero signals having previously undergone a polarity inversion, and K=3, i.e., said up/down counter comprises 3 D-type flip-flops, the logic arrangements associated with each of said flip-flops being interconnected such that their inputs and outputs satisfy the following logic equations:

for the first flip-flop:

$$D_1 = \overline{T^+ + T^- + \overline{Q_1}} + \overline{T^- + Q_2 + Q_3} + \overline{T^- + Q_2 + \overline{Q_3}} + \overline{T^+ + Q_2 + Q_3} + \overline{T^+ + \overline{Q_2} + Q_3}$$

for the second flip-flop:

$$D_2 = \overline{T^+ + T^- + \overline{Q_2}} + \overline{T^- + \overline{Q_1} + \overline{Q_3}} + \overline{T^+ + \overline{Q_1} + Q_3} + \overline{Q_1 + \overline{Q_2}}$$

for the third flip-flop:

$$D_3 = \overline{T^- + \overline{Q_3}} + \overline{T^+ + Q_1 + \overline{Q_2}} + \overline{Q_1 + \overline{Q_3}} + \overline{Q_2 + Q_3}$$

said end decoder performing the logic function:

$$T^+ \cdot \overline{Q_1} \cdot \overline{Q_2} \cdot Q_3 + T^- \cdot \overline{Q_1} \cdot \overline{Q_2} \cdot \overline{Q_3},$$

the magnitudes D and Q designating respectively the logic levels at the D input and at the Q output of said D-type flip-flops and the subscripts 1, 2 and 3 indicating that the magnitude refers to the first, second and third flip-flop, respectively.

11. The apparatus according to claim 10 wherein each of said logic arrangements comprises a plurality of OR-gates and the first and second logic circuits in said end-decoder each comprises an OR-gate.

12. The apparatus according to claim 11 wherein each of said OR-gates is a negative logic OR-gate, i.e., a NOR-gate.

13. The apparatus according to claim 9 wherein said transmitted signal is a ternary signal with n=6, i.e., said signal can assume any of 6 distinct states, said apparatus being further characterized in that:

said up-count input, hereinafter designated T+, receives the positive and zero values of said ternary signal;

said down-count input, hereinafter designated T−, receives the negative and zero values of said ternary signal, these negative and zero signals having previously undergone a polarity inversion;

K=3, i.e., said up/down counter comprises three D-type flip-flops, the logic arrangements associated with each of said flip-flops being interconnected such that their inputs and outputs satisfy the following logic equations:

for the first flip-flop:

$$D_1 = \overline{T^+ + T^- \overline{Q_1}} + \overline{T^- + \overline{Q_2} + Q_3} + \overline{T^+ + \overline{Q_3}} + \overline{T^+ + \overline{Q_2}}$$

for the second flip-flop:

$$D_2 = \overline{T^- + \overline{Q_2}} + \overline{T^+ + \overline{Q_1} + Q_1 + \overline{Q_2} + Q_3}$$

for the third flip-flop:

$$D_3 = \overline{T^- + \overline{Q_3}} + \overline{T^+ + Q_1 + \overline{Q_2}} + \overline{Q_1 + \overline{Q_2}}$$

said end decoder performing the logic function:

$$T^+ \cdot Q_1 \cdot Q_2 \cdot Q_3 + T^- \cdot \overline{Q_1} \cdot \overline{Q_2} \cdot \overline{Q_3},$$

the magnitudes D and Q designating respectively the logic levels at the D input and at the Q output of said D-type flip-flops and the subscripts 1, 2 and 3 indicating that the magnitude refers to the first, second and third flip-flops, respectively.

14. The apparatus according to claim 13 wherein each of said logic arrangements comprises a plurality of OR-gates and the first and second logic circuits in said end-decoder each comprises and OR-gate.

15. The apparatus according to claim 14 wherein each of said OR-gates comprises a negative logic OR-gate, i.e., a NOR-gate.

* * * * *